(12) United States Patent
Oba et al.

(10) Patent No.: US 11,906,081 B2
(45) Date of Patent: Feb. 20, 2024

(54) PIPE JOINT STRUCTURE AND AIR CONDITIONER

(71) Applicant: Mitsubishi Electric Corporation, Tokyo (JP)

(72) Inventors: Yasushi Oba, Tokyo (JP); Takuya Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 454 days.

(21) Appl. No.: 17/280,510

(22) PCT Filed: Dec. 20, 2018

(86) PCT No.: PCT/JP2018/046984
§ 371 (c)(1),
(2) Date: Mar. 26, 2021

(87) PCT Pub. No.: WO2020/129212
PCT Pub. Date: Jun. 25, 2020

(65) Prior Publication Data
US 2021/0341086 A1 Nov. 4, 2021

(51) Int. Cl.
*F24F 1/26* (2011.01)
*F16L 19/025* (2006.01)

(52) U.S. Cl.
CPC .............. *F16L 19/025* (2013.01); *F24F 1/26* (2013.01)

(58) Field of Classification Search
CPC ..... F24F 1/26; F24F 1/32; F16L 19/02; F16L 19/025
See application file for complete search history.

(56) References Cited

U.S. PATENT DOCUMENTS

| 9,279,526 | B2* | 3/2016 | McAlister | ........... F16L 19/0231 |
| 11,454,427 | B2* | 9/2022 | Kim | ....................... F16L 55/033 |

FOREIGN PATENT DOCUMENTS

| CN | 103453245 A | 12/2013 |
| CN | 103672224 A | 3/2014 |

(Continued)

OTHER PUBLICATIONS

Office Action dated Nov. 22, 2022 issued in corresponding CN patent application No. 201880097998.8 (and English translation).
(Continued)

*Primary Examiner* — Eric S Ruppert
(74) *Attorney, Agent, or Firm* — POSZ LAW GROUP, PLC

(57) ABSTRACT

A pipe joint structure includes: a union; a flare nut that includes a female thread formed at one of axially opposite ends of the flare nut, and a first annular surface formed at the other of the axially opposite ends of the flare nut; a cylindrical sleeve that houses the flare nut such that the flare nut can be rotate and moved forward and backward; a rotary ring that has a second annular surface located to face the first annular surface, and is attached to the sleeve such that the rotary ring can be rotated for the union; and a pressing member that presses the flare nut toward the rotary ring. At the second annular surface, a claw is formed in such a manner as to protrude towards the flare nut. The first annular surface includes an engagement surface that is formed in such a manner to face one side in a circumferential direction and a helically inclined surface that is adjacent to the engagement surface in the circumferential direction and formed helically in such a way as to incline and face the opposite side of the one side in the circumferential direction.

7 Claims, 7 Drawing Sheets

(56) References Cited

FOREIGN PATENT DOCUMENTS

| CN | 105570569 A | 5/2016 |
|---|---|---|
| CN | 108953356 A | 12/2018 |
| JP | S62-024091 A | 2/1987 |
| JP | H11-257333 A | 9/1999 |
| JP | 2003-074768 A | 3/2003 |

OTHER PUBLICATIONS

International Search Report dated Mar. 26, 2019, issued in corresponding International Application No. PCT/JP2018/046984.
Office Action dated May 7, 2022 issued in corresponding CN patent application No. 201880097998.8 (and Machine Translation).
Office Action dated Oct. 6, 2023 issued in corresponding German Patent Application No. 112018008219.9 (and English translation).

* cited by examiner

PIPE JOINT STRUCTURE AND AIR CONDITIONER

CROSS REFERENCE TO RELATED APPLICATION

This application is a U.S. National Stage Application of International Application No. PCT/JP2018/046984, filed on Dec. 20, 2018, the contents of which are incorporated herein by reference.

TECHNICAL FIELD

The present disclosure relates to a pipe joint structure that connects two pipes and an air-conditioning apparatus provided with the pipe joint structure.

BACKGROUND ART

Patent Literature 1 describes a structure of a pipe joint. The pipe joint includes a connection port body and a flare nut. The connection port body has a tubular shape. The flare nut is tubularly formed such that the diameter of the flare nut varies, and is screwed to the connection port body. The connection port body and the flare nut include a first engagement rib and a second engagement rib, respectively. The first engagement rib and the second engagement rib are engaged with each other when the connection port body and the flare nut are completely connected to each other. The patent literature discloses that because of engagement of the first engagement rib and the second engagement rib, the connection port body and the flare nut that have been connected are not easily disconnected from each other.

CITATION LIST

Patent Literature

Patent Literature 1: Japanese Unexamined Patent Application Publication No. 2003-74768

SUMMARY OF INVENTION

Technical Problem

However, in the structure of the pipe joint in Patent Literature 1, if a high torque is applied between the connection port body and the flare nut in the opposite direction to a direction which the connection port body and the flare nut are tightened, the first engagement rib or the second engagement rib may be broken, and the connection between the connection port body and the flare nut may thus be loosened.

The present disclosure is applied to solve the above problem, and relates to a pipe joint structure and an air-conditioning apparatus that can prevent the connection between connected pipes from being loosened.

Solution to Problem

A pipe joint structure according to one embodiment of the present disclosure is a pipe joint structure that connects two pipes, and includes a union, a flare unit, a cylindrical sleeve, a rotary ring, and a pressing member. The union is connected to one of the two pipes, and includes a male thread and a tapered outer circumferential surface. The flare nut includes: a female thread that is formed at one of axially opposite ends of the flare nut, and is fitted to the male thread; a through-hole that is formed in the other of the axially opposite ends of the flare nut, and allows the other of the two pipes to pass through the through-hole; a tapered inner circumferential surface that is formed between the female thread and the through-hole, and is located such that a flare portion of the other of the two pipes is sandwiched between the inner circumferential surface and the outer circumferential surface; and a first annular surface that is formed around the through-hole at the other of the axially opposite ends of the flare nut. The cylindrical sleeve houses the flare nut such that the flare nut can be rotated and moved forward and backward. The rotary ring has a second annular surface located to face the first annular surface, and is attached to the sleeve such that the rotary ring can be rotated for the union. The pressing member is configured to press the flare nut toward the rotary ring. At the second annular surface, a claw is formed in such a manner as to protrude toward the flare nut. The first annular surface includes an engagement surface that is formed in such a manner to face one side in a circumferential direction and a helically inclined surface that is adjacent to the engagement surface in the circumferential direction and formed helically in such a way as to incline and face the opposite side of the one side in the circumferential direction.

An air-conditioning apparatus according to another embodiment of the present disclosure includes: an indoor unit that include an indoor heat exchanger and an indoor pipe extending from the indoor heat exchanger; and an outdoor unit connected to the indoor unit by an extension pipe. The indoor pipe and the extension pipe are connected by the pipe joint structure according to the above one embodiment of the present disclosure.

Advantageous Effects of Invention

According to the embodiments of the present disclosure, when torque is applied to the rotary ring in a tightening direction for the union, the claw of the rotary ring is engaged with the engagement surface of the flare nut. Thus, the torque is transmitted from the rotary ring to the flare nut, thereby causing the flare nut to rotate in the tightening direction for the union. By contrast, when torque is applied to the rotary ring in the opposite direction to the tightening direction, the torque is not transmitted to the flare nut, and the rotary ring fails to engage. The flare nut is housed in the cylindrical sleeve such that the flare nut can be rotated. It is therefore possible to prevent the torque in the opposite direction from being applied to the flare nut without being transmitted through the rotary ring. Therefore, according to the embodiments of the present disclosure, it is possible to prevent the connection between the pipes from being loosened.

DESCRIPTION OF EMBODIMENT

Embodiment 1

Figure 1:
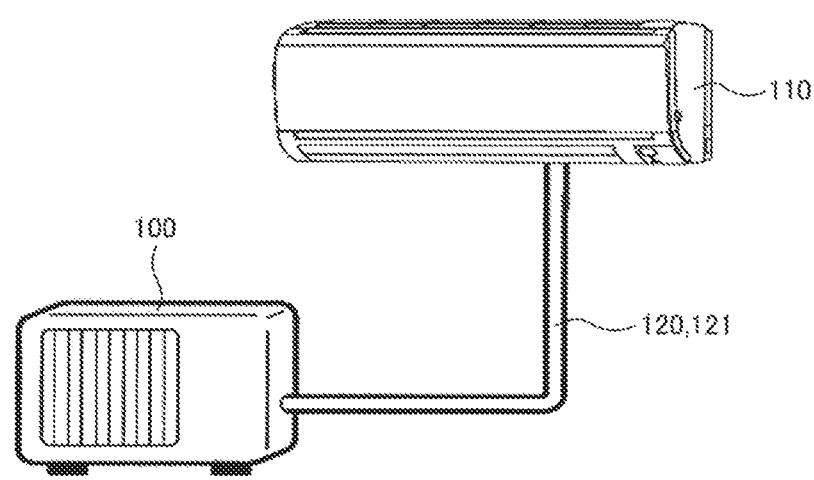
FIG. 1 is a schematic view illustrating a configuration of an air-conditioning apparatus according to Embodiment 1 of the present disclosure.

A pipe joint structure and an air-conditioning apparatus according to Embodiment 1 of the present disclosure will be described. FIG. 1 is a schematic view illustrating a configuration of an air-conditioning apparatus according to Embodiment 1. As illustrated in FIG. 1, the air-conditioning apparatus includes an outdoor unit 100 installed in an outdoor space and an indoor unit 110 installed in an indoor space. The outdoor unit 100 houses a compressor, a four-way valve, an outdoor heat exchanger, an expansion valve, and an outdoor fan that supplies air to the outdoor heat exchanger. The indoor unit 110 houses an indoor heat exchanger and an indoor fan that supplies air to the indoor heat exchanger. The indoor unit 110 will be described later with reference to FIGS. 2 and 3. The compressor, the four-way valve, the outdoor heat exchanger, the expansion valve, and the indoor heat exchanger are sequentially connected by refrigerant pipes, thereby forming a refrigerant circuit. Refrigerant circulates in the refrigerant circuit to achieve a refrigeration cycle.

The refrigerant provided in the refrigerant circuit is, for example, a flammable refrigerant such as HFC-32, an HFO refrigerant, or R290 (propane). This flammable refrigerant is a refrigerant having flammability that is higher than or equal to the flammability of a slightly flammable refrigerant (for example, 2 L or higher in the ASHRAE 34 classification). HFC-32 and HFO refrigerants have flammability corresponding to the flammability of a slightly flammable refrigerant or a mildly flammable refrigerant. R290 has flammability corresponding to the flammability of a highly flammable refrigerant.

The air-conditioning apparatus includes two extension pipes 120 and 121 that connect the outdoor unit 100 and the indoor unit 110. The extension pipes 120 and 121 are included in the above refrigerant pipes. The extension pipe 120 is a gas pipe provided mainly to allow gaseous refrigerant to flow. The extension pipe 121 is a liquid pipe provided mainly to allow liquid refrigerant or two-phase refrigerant to flow. In a process of installing the air-conditioning apparatus, the two extension pipes 120 and 121 are bundled together with a drain pipe and electric wires into a single pipe, as illustrated in FIG. 1.

Figure 2:
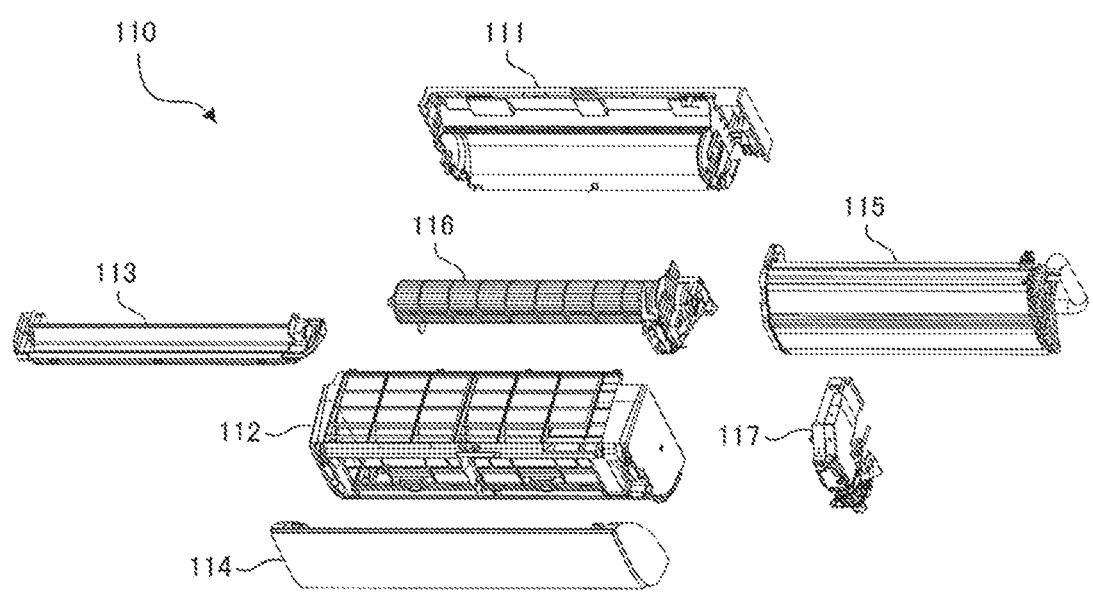
FIG. 2 is an exploded perspective view illustrating a configuration of an indoor unit 110 of the air-conditioning apparatus according to Embodiment 1 of the present disclosure.

FIG. 2 is an exploded perspective view illustrating a configuration of the indoor unit 110 of the air-conditioning apparatus according to Embodiment 1. As illustrated in FIG. 2, the indoor unit 110 includes a rear housing portion 111, a front housing portion 112, an air-outlet housing portion 113, a front design panel 114, an indoor heat exchanger 115, an indoor fan 116, and an electric component box 117. The rear housing portion 111, the front housing portion 112, and the air-outlet housing portion 113 form the housing of the indoor unit 110. The front design panel 114 is attached to the front housing portion 112 such that the front design panel 114 can be opened and closed and can also be detached from the front housing portion 112. The indoor heat exchanger 115, the indoor fan 116, and the electric component box 117 are housed in the housing of the indoor unit 110. The indoor heat exchanger 115 forms part of the refrigerant circuit, and is a heat exchanger that causes heat exchange to be performed between the refrigerant and indoor air. The indoor fan 116 is a crossflow fan configured to supply air to the indoor heat exchanger 115. The electric component box 117 houses various electric components.

Figure 3:
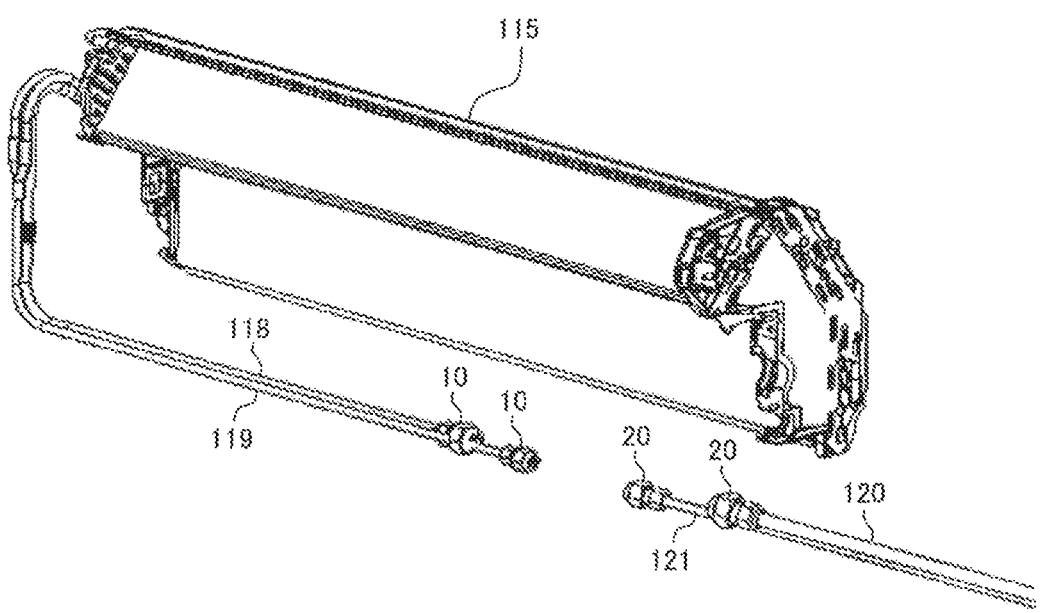
FIG. 3 is a perspective view illustrating a configuration of an indoor heat exchanger 115 and extension pipes 120 and 121 included in the air-conditioning apparatus according to Embodiment 1 of the present disclosure.

FIG. 3 is a perspective view illustrating a configuration of the indoor heat exchanger 115 and the extension pipes 120 and 121 included in the air-conditioning apparatus according to Embodiment 1. As illustrated in FIG. 3, the indoor heat exchanger 115 includes indoor pipes 118 and 119 that extend from a main body of the indoor heat exchanger 115. In a manufacturing process the indoor heat exchanger 115, the indoor pipes 118 and 119 are connected to the main body of the indoor heat exchanger 115 by brazing or other techniques. The indoor pipe 118 is a gas pipe provided mainly to allow gas refrigerant to flow. The indoor pipe 119 is a liquid pipe provided mainly to allow liquid refrigerant or two-phase refrigerant to flow. The diameter of the indoor pipe 118 is larger than that of the indoor pipe 119. The length of the indoor pipe 118 is shorter than that of the indoor pipe 119. One end of the extension pipe 120, which is a gas pipe, is connected to a distal end of the indoor pipe 118. One end of the extension pipe 121, which is a liquid pipe, is connected to a distal end of the indoor pipe 119. The diameter of the extension pipe 120 is larger than that of the extension pipe 121.

Next, a gas-pipe joint structure that connects the indoor pipe 118 and the extension pipe 120 will be described. A liquid-pipe joint structure that connects the indoor pipe 119 and the extension pipe 121 is the same as the gas-pipe joint structure, except that the gas-pipe join structure and the liquid-pipe joint structure have different dimensions, and the description of the liquid-pipe joint structure will thus be omitted.

Figure 4:
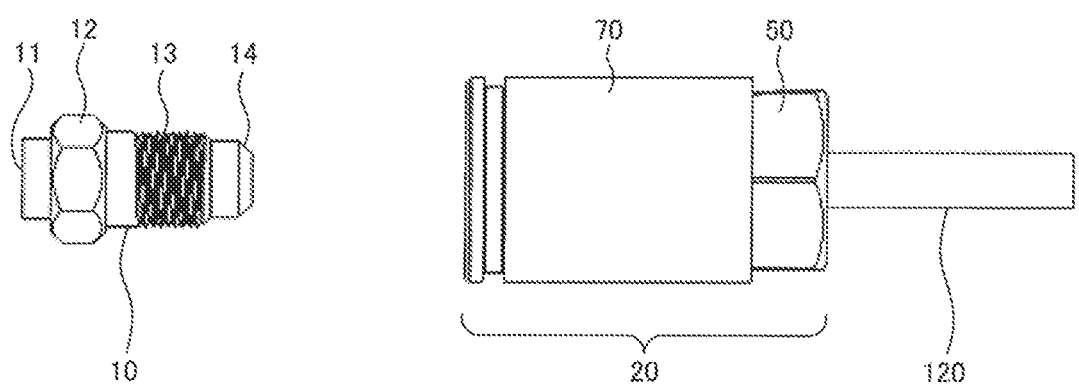
FIG. 4 is a view illustrating a configuration of components of a pipe joint structure according to Embodiment 1 of the present disclosure.
Figure 5:
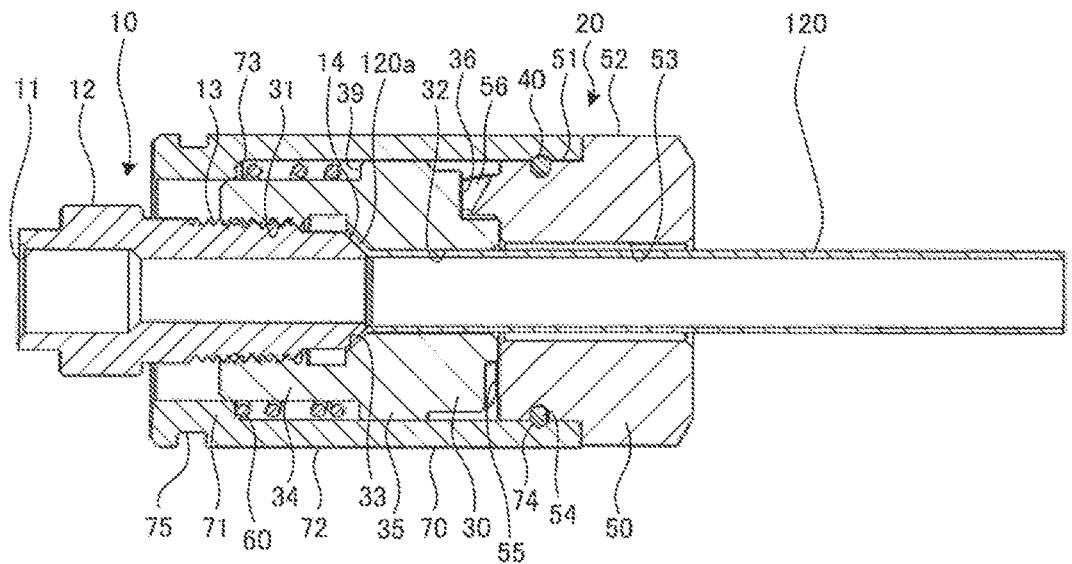
FIG. 5 is a sectional view illustrating a configuration of the pipe joint structure according to Embodiment 1 of the present disclosure.
Figure 6:
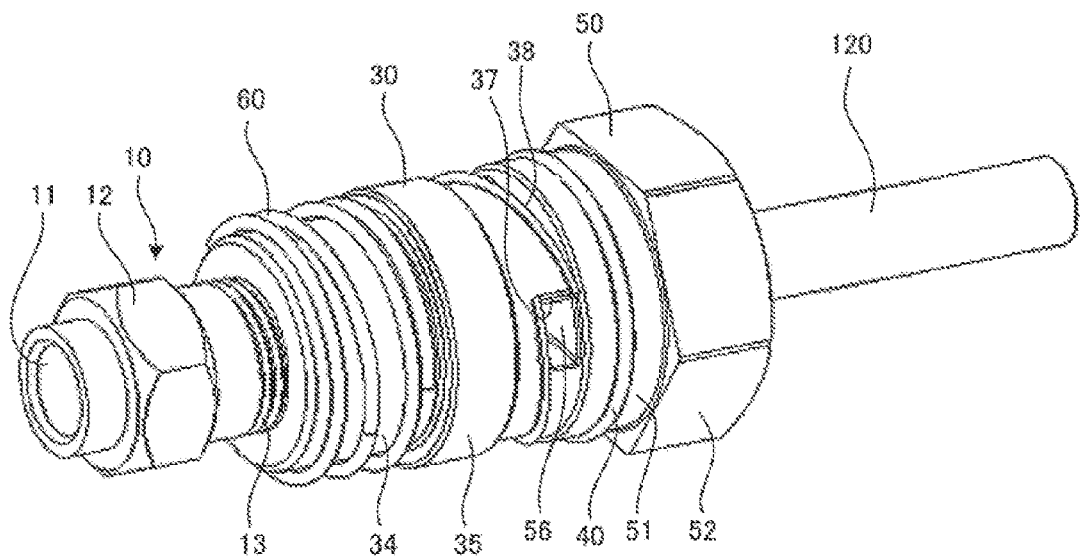
FIG. 6 is a perspective view illustrating the configuration of the pipe joint structure according to Embodiment 1 of the present disclosure.

FIG. 4 is a view illustrating a configuration of components of the pipe joint structure according to Embodiment 1. FIG. 5 is a sectional view illustrating a configuration of the pipe joint structure according to Embodiment 1. FIG. 6 is a perspective view illustrating the configuration of the pipe joint structure according to Embodiment 1. In FIG. 6, the configuration of the pipe joint structure is illustrated, with a sleeve 70, which will be described later, seen through.

As illustrated in FIGS. 4 to 6, the pipe joint structure includes a union 10 and a nut assembly 20 connected to the union 10. An axial direction of each of the union 10 and the nut assembly 20 is a lateral direction in FIGS. 4 and 5. The left side in FIGS. 4 and 5 will be sometimes referred to as one end side in the axial direction of each of the union 10 and the nut assembly 20. The right side in FIGS. 4 and 5 will be sometimes referred to as the other end side in the axial direction of each of the union 10 and the nut assembly 20.

The union 10 is attached to the distal end of the indoor pipe 118 (not illustrated in FIGS. 4 to 6). The union 10 is a so-called single-sided insertion union that includes an insertion hole 11 on the one end side in the axial direction and a male thread 13 on the other end side in the axial direction. In the insertion hole, the distal end of the indoor pipe 118 is inserted. The union 10 is made of metal. In the manufacturing process of the indoor heat exchanger 115, the union 10 and the indoor pipe 118 inserted in the insertion hole 11 are joined together by brazing or other methods. The union 10 includes a head 12 having a regularly hexagonal column shape and a tapered outer circumferential surface 14 formed on a distal end of the union 10 on the other end side in the axial direction. The union 10 will be sometimes referred to as a flare bolt.

The nut assembly 20 is attached to the extension pipe 120. The nut assembly 20 is an assembly component that includes a flare nut 30, which will be described later. A configuration of the nut assembly 20 and the extension pipe 120 at a shipment stage of the air-conditioning apparatus, at which the air-conditioning apparatus can be shipped, will be described later with reference to FIGS. 10 to 13. At the one end of the extension pipe 120, a flare portion 120a is provided. The flare portion 120a is formed into a conical shape.

Figure 7:
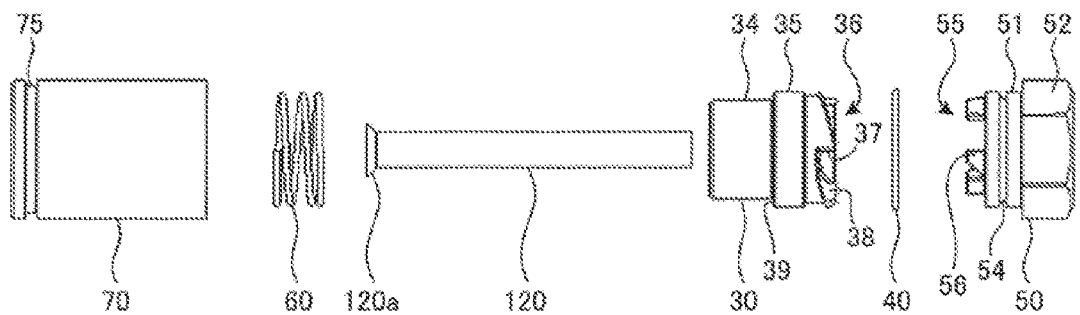
FIG. 7 is an exploded view illustrating a configuration of a nut assembly 20 in the pipe joint structure according to Embodiment 1 of the present disclosure.

FIG. 7 is an exploded view illustrating a configuration of the nut assembly 20 in the pipe joint structure according to Embodiment 1. As illustrated in FIGS. 5 to 7, the nut assembly 20 includes the flare nut 30, a retaining ring 40, a rotary ring 50, a coil spring 60, and the sleeve 70. The flare nut 30, the retaining ring 40, the rotary ring 50, the coil spring 60, and the sleeve 70 are all made of metal. The axial direction of each of the flare nut 30, the retaining ring 40, the rotary ring 50, the coil spring 60, and the sleeve 70 corresponds to the lateral direction in FIGS. 5 and 7. The left side in FIGS. 5 and 7 will be sometimes referred to as one end side in the axial direction of each of the flare nut 30, the retaining ring 40, the rotary ring 50, the coil spring 60, and the sleeve 70. The right side in FIGS. 5 and 7 will be sometimes referred to as the other end side in the axial direction of each of the flare nut 30, the retaining ring 40, the rotary ring 50, the coil spring 60, and the sleeve 70.

The flare nut 30 includes a female thread 31 on the one end side in the axial direction and a through-hole 32 on the other end side in the axial direction. The female thread 31 are engaged with the male thread 13 of the union 10, and the extension pipe 120 is passed through the through-hole 32. The flare nut 30 has a tapered inner circumferential surface 33 that is formed between the female thread 31 and the through-hole 32 in the axial direction. The flare portion 120a of the extension pipe 120 is sandwiched between the inner circumferential surface and the outer circumferential surface 14 of the union 10. The flare nut 30 has a small outside-diameter portion 34 on the one end side in the axial direction and a large outside-diameter portion 35 on the other end side in the axial direction. The small outside-diameter portion has a relatively small outer diameter, and the large outside-diameter portion is larger in outer diameter than the small outside-diameter portion 34, and has a flange shape. The small outside-diameter portion 34 and the large outside-diameter portion 35 each have an outer circumferential surface that is formed in the shape of a cylinder. At a step between the small outside-diameter portion 34 and the large outside-diameter portion 35, a contact surface 39 is provided to be in contact with the other end of axially opposite ends of the coil spring 60 that is located on the other end side in the axial direction.

Figure 8:
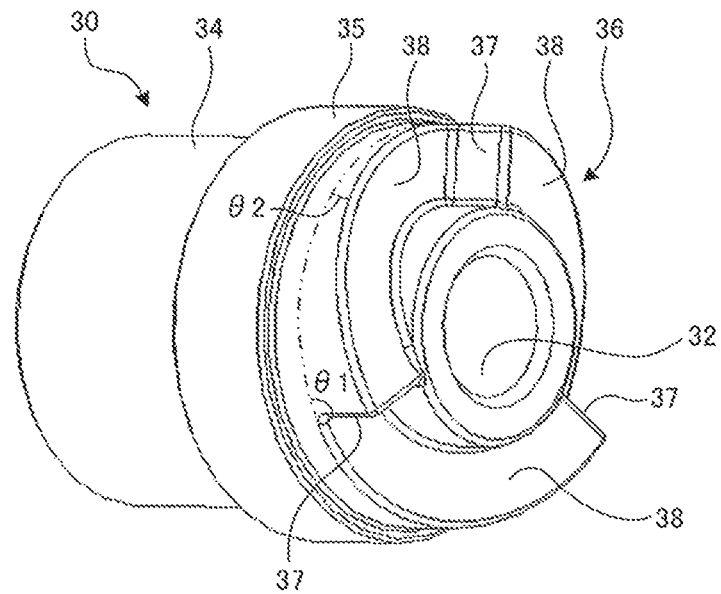
FIG. 8 is a perspective view illustrating a configuration of a flare nut 30 in the pipe joint structure according to Embodiment 1 of the present disclosure, as viewed from the other end side in an axial direction.

FIG. 8 is a perspective view illustrating a configuration of the flare nut 30 in the pipe joint structure according to Embodiment 1, as viewed from the other end side in the axial direction. As illustrated in FIG. 8, the other end of axially opposite ends of the flare nut 30 that is located on the other end side in the axial direction has a first annular surface 36 formed annularly around an opening end of the through-hole 32. The first annular surface 36 includes engagement surfaces 37 and helically inclined surfaces 38 each of which is adjacent to an associated one of the engagement surfaces 37 in a circumferential direction. Each of the engagement surfaces 37 is inclined in such a manner as to face one side in the circumferential direction. Where a flat surface orthogonal to the axial direction of the flare nut 30 is a reference surface, an inclination angle θ1 at which the engagement surface 37 is inclined to the reference surface is approximately 90 degrees. The engagement surfaces 37 are engaged with respective claws 56, which will be described later, when the rotary ring 50 is rotated in a tightening direction where the rotary ring 50 is tightened. The helically inclined surface 38 is helically inclined to face in the opposite direction of the direction in which the engagement surface 37 faces, that is, such that the helically inclined surface 38 faces the opposite side of the above one side in the circumferential direction. An inclination angle θ2 at which the helically inclined surface 38 is inclined to the reference surface is less than the above inclination angle θ1 of the engagement surface 37 (θ2<θ1). The helically inclined surface 38 is formed in such a manner as to cause the claw 56 to slide in the circumferential direction when the rotary ring 50 is rotated in the opposite direction of the tightening direction.

A helical direction of the helically inclined surface 38 in which the helically inclined surface 38 is helical is the same as a helical direction of the female thread 31 in which the female thread 31 is helical. In Embodiment 1, since the male thread 13 is a right-handed thread, a helical groove of the female thread 31 is formed in the shape of a right-handed helix. Thus, the helically inclined surface 38 is also formed in the shape of a right-handed helix. This right-handed helix is a helix that is moved by a right-hand turning motion, that is, a clockwise screwing motion, in a direction away from a viewer as viewed along the axis of the helix.

In Embodiment 1, three sets of engagement surfaces 37 and helically inclined surfaces 38 are arranged at regular intervals in the circumferential direction such that each set of the engagement surface and the helically inclined surface are inclined in respective directions in which the engagement surface and the helically inclined surface face each other. The number of sets of the engagement surfaces 37 and the helically inclined surfaces 38 may be one, two, or four or more.

Re-referring to FIGS. 5 and 7, the sleeve 70 has a cylindrical shape. The entire the flare nut 30 is housed inside the sleeve 70 such that the flare nut 30 can be rotated and be moved forward and backward. The sleeve 70 has a small inside-diameter portion 71 on the one end side in the axial direction and a large inside-diameter portion 72 on the other end side in the axial direction. The small outside-diameter portion 34 of the flare nut 30 is fit in the small inside-diameter portion 71 in such a manner as to be slidable, and the large outside-diameter portion 35 of the flare nut 30 is fit in the large inside-diameter portion 72 in such a manner to be slidable. The inside diameter of the small inside-diameter portion 71 is greater than or equal to the outside diameter of the small outside-diameter portion 34 of the flare nut 30, and is smaller than an outer diameter of the large outside-diameter portion 35 of the flare nut 30. The inside diameter of the large inside-diameter portion 72 is greater than or equal to the outside diameter of the large outside-diameter portion 35 of the flare nut 30. In the sleeve 70, at a step between the small inside-diameter portion 71 and the large inside-diameter portion 72, a support surface 73 is formed to support one end of the axially opposite ends of the coil spring 60 that is located on the one end side in the axial direction.

In part of the inner circumferential surface of the sleeve 70 that is close to the other side in the axial direction, inner circumferential grooves 74 are formed to extend circumferentially. In part of an outer circumferential surface of the sleeve 70 that is close to the one side in the axial direction, cap grooves 75 are formed to extend circumferentially. In the cap grooves 75, respective claws 84 formed at a cap 80 that will be described later are fitted.

The rotary ring 50 is a ring-shaped member having a through-hole 53 through which the extension pipe 120 is passed in the axial direction. The rotary ring 50 includes a cylindrical insertion portion 51 that is adjacent to the one end side in the axial direction, and a head 52 that has, for example, a regularly hexagonal column shape and is close to the other end side in the axial direction. The insertion portion 51 is inserted from the other end side in the axial direction into the large inside-diameter portion 72 of the sleeve 70. In an outer circumferential surface of the insertion portion 5, an outer circumferential groove 54 is formed to extend circumferentially. The head 52 is not inserted in the sleeve 70, that is, the head 72 is projected from the sleeve 70 on the other side in the axial direction. That is, of the flare nut 30 and the rotary ring 50, only the head 52 of the rotary ring 50 is exposed from the sleeve 70 to the outside thereof as viewed in the radial direction of the sleeve 70.

The retaining ring 40 is a member that prevents the rotary ring 50 from coming off the sleeve 70. The retaining ring 40 is C-shaped or O-shaped. An inner circumferential portion of the retaining ring 40 is fitted in the outer circumferential groove 54 of the rotary ring 50 in such a manner as to be slidable. An outer circumferential portion of the retaining ring 40 is fitted in the inner circumferential groove 74 of the sleeve 70 in such a manner as to be slidable. Thus, the rotary ring 50 is attached to the sleeve 70 through the retaining ring 40, such that the rotary ring 50 can be rotated relative to the sleeve 70 and cannot be removed from the sleeve 70 or fitted into the sleeve 70. The rotary ring 50 can be also rotated for the union 10.

The rotary ring 50 may be attached to the sleeve 70 by press fitting. In this case, the rotary ring 50 is fixed to the sleeve 70 such that the rotary ring 50 cannot be removed from the sleeve 70 or fitted into the sleeve 70, and the rotary ring 50 and the sleeve 70 can be rotated relative to the union 10. In the case where the rotary ring 50 is attached to the sleeve 70 by press fitting, the retaining ring 40 can be omitted. In this case, the number of components of the nut assembly 20 can be reduced.

Figure 9:
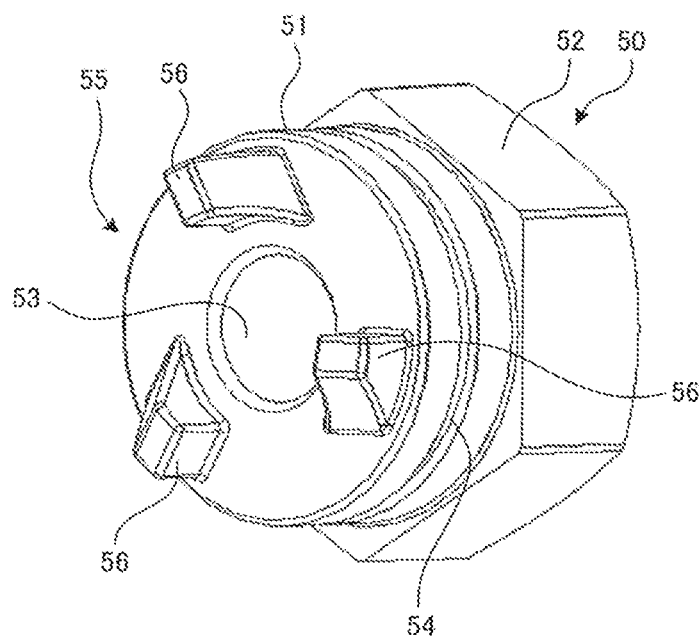
FIG. 9 is a perspective view illustrating a configuration of a rotary ring 50 in the pipe joint structure according to Embodiment 1 of the present disclosure, as viewed from one end side in the axial direction.

FIG. 9 is a perspective view illustrating a configuration of the rotary ring 50 in the pipe joint structure according to Embodiment 1, as viewed from the one end side in the axial direction. As illustrated in FIG. 9, at one of axially opposite ends of the insertion portion 51 of the rotary ring 50, a second annular surface 55 is formed annularly around an edge of an opening end of the through-hole 53. In the sleeve 70, the second annular surface 55 is located in such a manner as to face the first annular surface 36 of the flare nut 30. At the second annular surface 55, at least one claw 56 is formed in such a manner as to protrude toward the one end side in the axial direction, that is, toward the flare nut 30. The claw 56 is formed in the shape of a trapezoid having a flat distal end. In Embodiment 1, three claws 56 are arranged at regular intervals in the circumferential direction. The number of the claws 56 is less than or equal to the number of sets of the engagement surfaces 37 and the helically inclined surfaces 38. The claws 56, the engagement surfaces 37, and the helically inclined surfaces 38 serve as a ratchet mechanism that transmits torque from the rotary ring 50 to the flare nut 30 in one direction and does not transmit torque in the opposite direction to the one direction.

Re-referring to FIGS. 5 and 7, the coil spring 60 is provided between an outer circumferential surface of the small outside-diameter portion 34 of the flare nut 30 and the inner circumferential surface of the sleeve 70. The coil spring 60 is a helical compression spring. The one end of the axially opposite ends of the coil spring 60 is supported by the support surface 73 of the sleeve 70, and the other end of the axially opposite ends of the coil spring 60 is in contact with the contact surface 39 of the flare nut 30. The flare nut 30 is pressed by the coil spring 60 toward the rotary ring 50 relative to the sleeve 70. Thus, the first annular surface 36 of the flare nut 30 and the second annular surface 55 of the rotary ring 50 are pressed against each other, whereby the claws 56 of the second annular surface 55 are at all times in contact with the engagement surfaces 37 or the helically inclined surfaces 38 of the first annular surface 36. The coil spring 60 is an example of a pressing member that presses the flare nut 30 toward the rotary ring 50.

Figure 10:
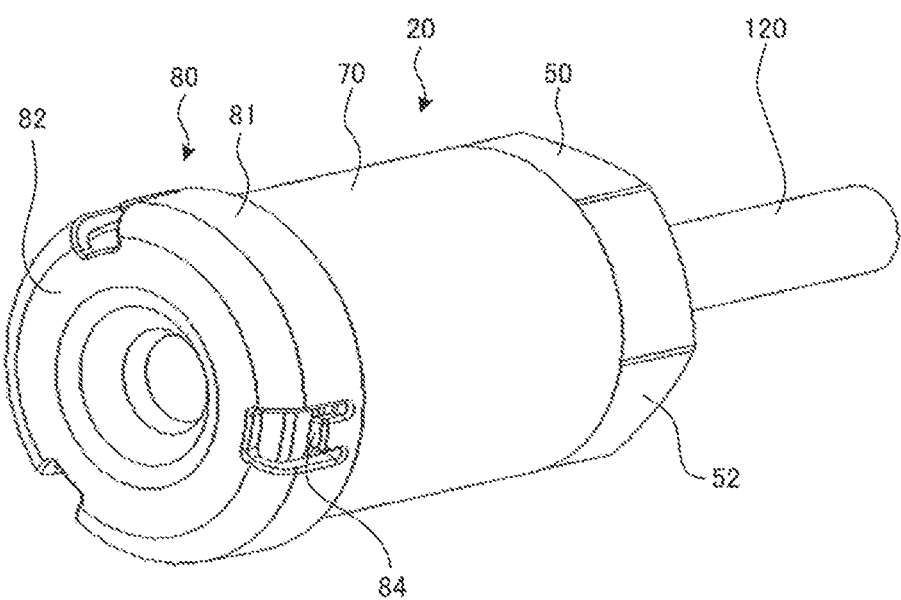
FIG. 10 is a perspective view illustrating a configuration of the nut assembly 20 and the extension pipe 120 at a shipment stage of the air-conditioning apparatus according to Embodiment 1 of the present disclosure.
Figure 11:
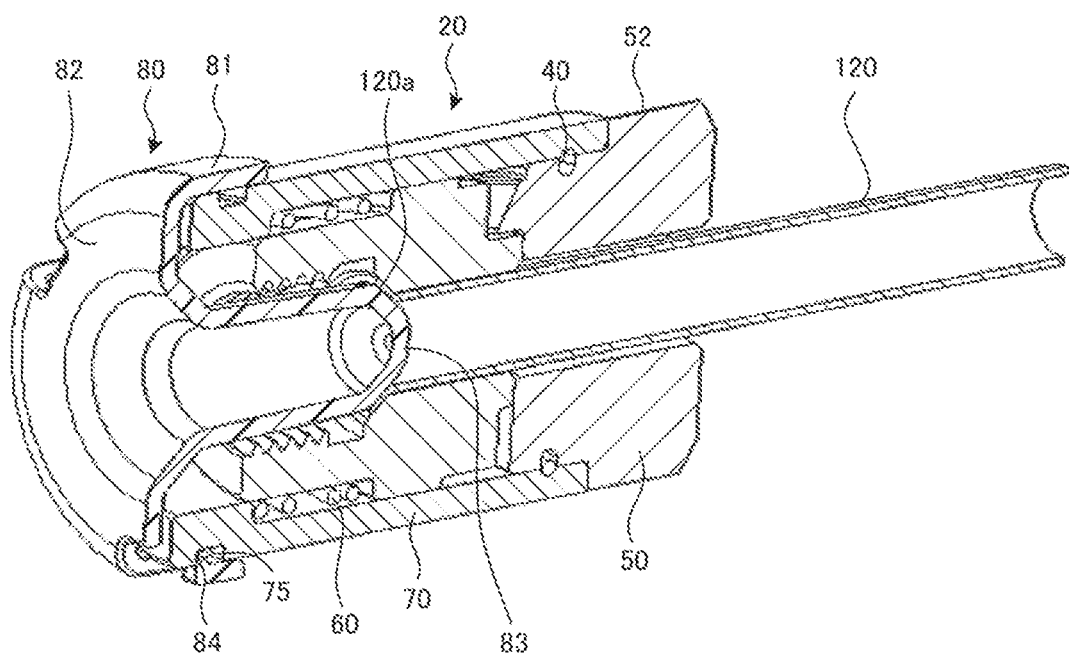
FIG. 11 is a perspective sectional view illustrating the configuration of the nut assembly 20 and the extension pipe 120 at the shipment stage of the air-conditioning apparatus according to Embodiment 1 of the present disclosure.

Next, a configuration of the nut assembly 20 and the extension pipe 120 at a shipment stage of the air-conditioning apparatus at which the air-conditioning apparatus can be shipped will be described. At the shipment stage of the air-conditioning apparatus, the nut assembly 20 and the extension pipe 120 are packed as a nut-equipped pipe in which the nut assembly 20 is attached to at least one end of the extension pipe 120. FIG. 10 is a perspective view illustrating a configuration of the nut assembly 20 and the extension pipe 120 at the shipment stage of the air-conditioning apparatus according to Embodiment 1. FIG. 11 is a perspective sectional view illustrating the configuration of the nut assembly 20 and the extension pipe 120 at the shipment stage of the air-conditioning apparatus according to Embodiment 1. As illustrated in FIGS. 10 and 11, at the shipment stage of the air-conditioning apparatus, the nut assembly 20 is attached to the one end of the extension pipe 120. The cap 80 made of resin is detachably attached to the nut assembly 20. Because of attachment of the cap 80 to the nut assembly 20, the flare portion 120a that corresponds to the one end of the extension pipe 120 is protected and the nut assembly 20 is fixed to the one end of the extension pipe 120.

Figure 12:
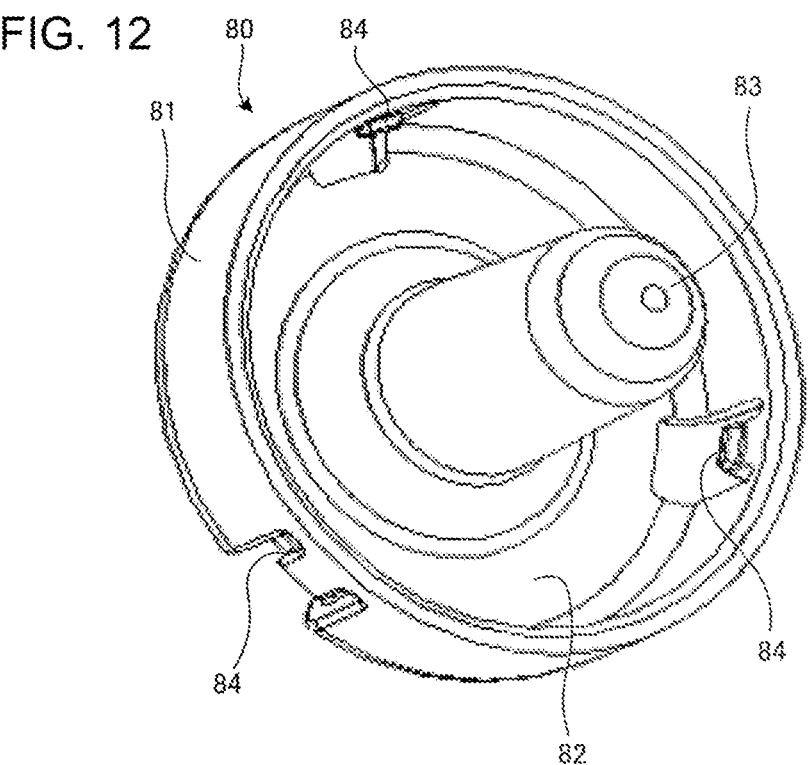
FIG. 12 is a perspective view illustrating a configuration of a cap 80 according to Embodiment 1 of the present disclosure.
Figure 13:
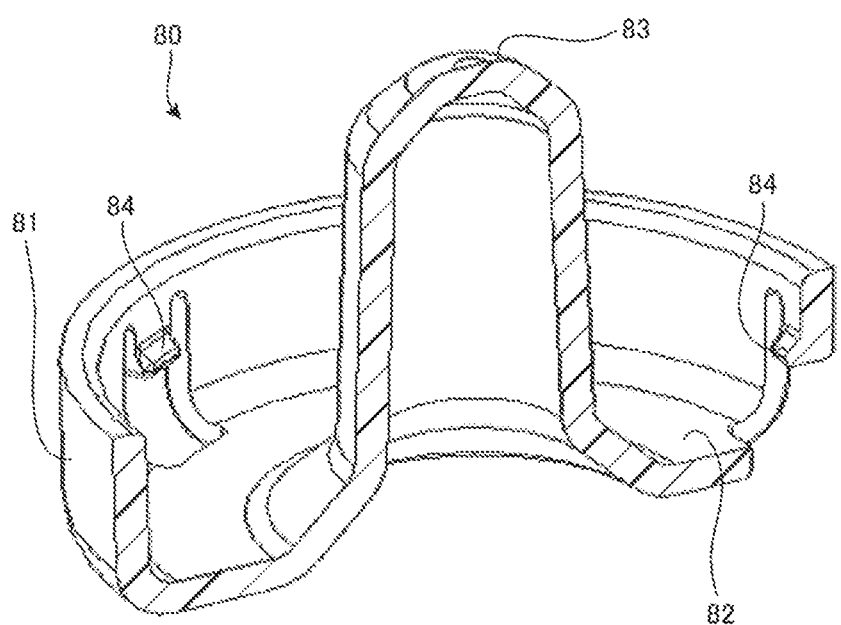
FIG. 13 is a perspective sectional view illustrating the configuration of the cap 80 according to Embodiment 1 of the present disclosure.

FIG. 12 is a perspective view illustrating a configuration of the cap 80 according to Embodiment 1. FIG. 13 is a perspective sectional view illustrating the configuration of the cap 80 according to Embodiment 1. As illustrated in FIGS. 12 and 13, the cap 80 includes a side wall 81 having a cylindrical shape, a bottom surface portion 82 that closes one of axially opposite ends of the side wall 81, and a projection 83 that protrudes from a central portion of the bottom surface portion 82 toward the other end side in the axial direction. The projection 83 is located such that the flare portion 120a of the extension pipe 120 is sandwiched between the projection and the tapered inner circumferential surface 33 of the flare nut 30.

At the side wall 81, claws 84 are formed in such a manner as to protrude toward an inner circumferential side. In Embodiment 1, three claws 84 are arranged at regular intervals in the circumferential direction. When the cap 80 is attached to the nut assembly 20, the three claws 84 are fitted in the cap grooves 75 of the sleeve 70.

Next, motion of the pipe joint structure according to Embodiment 1 will be described. When the indoor pipe 118 and the extension pipe 120 are connected, by using a wrench and a torque wrench, torque is applied between the head 12 of the union 10 and the head 52 of the rotary ring 50 in the tightening direction. Since the flare nut 30 is housed inside the sleeve 70 such that the flare nut can be rotated, the torque is not directly applied to the flare nut 30, that is, the torque is applied to the flare nut 30 only through the rotary ring 50. Because of the pressing force of the coil spring 60, the claws 56 of the rotary ring 50 are in contact with the engagement surfaces 37 or the helically inclined surfaces 38 of the flare nut 30 at all times.

Figure 14:
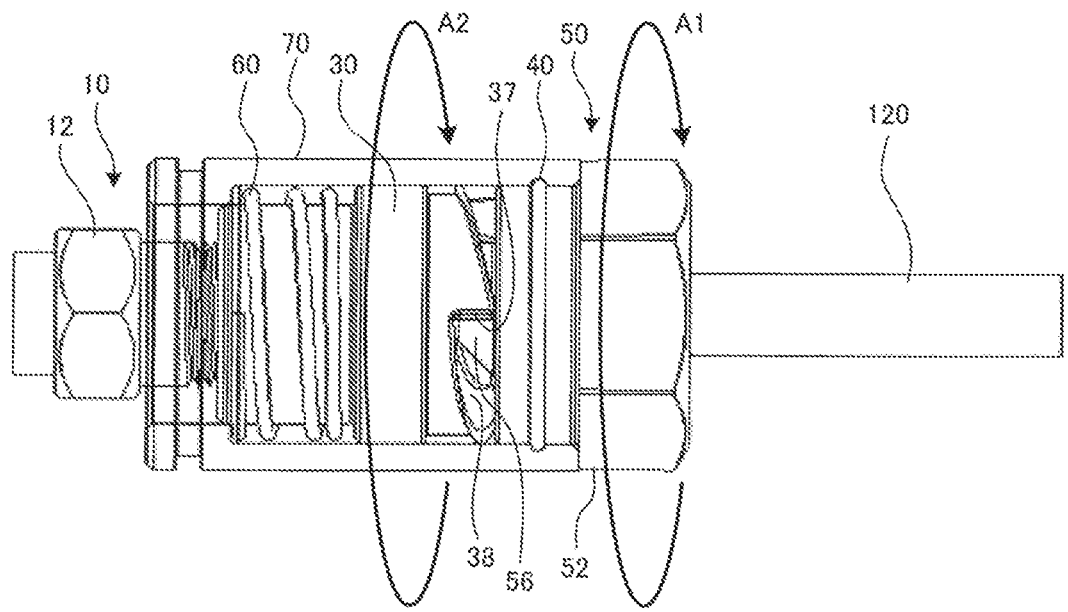
FIG. 14 is a drawing illustrating motion of the pipe joint structure according to Embodiment 1 of the present disclosure in the case where torque is applied to the rotary ring 50 in a tightening direction.

FIG. 14 is a view illustrating motion of the pipe joint structure according to Embodiment 1 in the case where torque is applied to the rotary ring 50 in the tightening direction. As illustrated in FIG. 14, when torque is applied to the rotary ring 50 in the tightening direction (a direction indicated by an arrow A1), the claws 56 of the rotary ring 50 are engaged with the engagement surfaces 37 of the flare nut 30. Thus, the torque in the tightening direction is transmitted from the rotary ring 50 to the flare nut 30, thereby causing the flare nut 30 to rotate for the union 10 in the tightening direction (a direction indicated by an arrow A2). As a result, the flare portion 120a of the extension pipe 120 is sandwiched between the outer circumferential surface 14 of the union 10 and the inner circumferential surface 33 of the flare nut 30, and the indoor pipe 118 and the extension pipe 120 are connected together.

Figure 15:
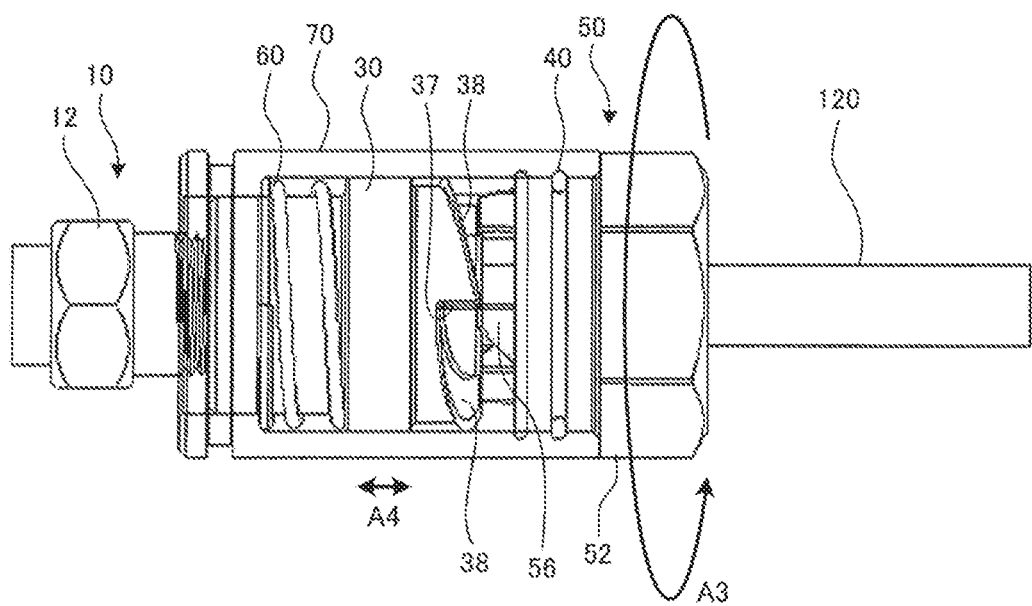
FIG. 15 is a drawing illustrating motion of the pipe joint structure according to Embodiment 1 of the present disclosure in the case where torque is applied to the rotary ring 50 in the opposite direction to the tightening direction.

FIG. 15 is a drawing illustrating motion of the pipe joint structure according to Embodiment 1 in the case where torque is applied to the rotary ring 50 in the opposite direction to the tightening direction. As illustrated in FIG. 15, when torque is applied to the rotary ring 50 in the opposite direction to the tightening direction (a direction indicated by an arrow A3), the claws 56 of the rotary ring 50 are not engaged with the engagement surfaces 37, but are slid along the helically inclined surfaces 38 of the flare nut 30 in the circumferential direction. Each of the claws 56 is slid along an associated one of the helically inclined surfaces 38 in the circumferential direction, slipped down an associated one of the engagement surfaces 37, and then slid along a subsequent one of the helically inclined surfaces 38 in the circumferential direction. Each claw 56 repeatedly performs these motion. Thus, the torque applied to the rotary ring 50 in the opposite direction to the tightening direction is not transmitted from the rotary ring 50 to the flare nut 30, and the rotary ring 50 fails to engage. As the rotary ring 50 is rotated, the flare nut 30 is moved forward and backward together with the union 10 in the axial direction (a direction indicated by an arrow A4) by a distance equal to a height of each of the engagement surfaces 37 that is measured in the axial direction. In such a manner, when torque is applied to the rotary ring 50 in the opposite direction to the tightening direction, the torque is not transmitted to the flare nut 30. It is therefore possible to prevent the connection of the flare nut 30 to the union 10 from being loosened by a person, for example.

As described above, the pipe joint structure according to Embodiment 1 is a pipe joint structure that connects the indoor pipe 118 and the extension pipe 120. The pipe joint structure includes the union 10, the flare nut 30, the cylindrical sleeve 70, the rotary ring 50, and the coil spring 60. The union 10 is connected to the indoor pipe 118, and provided with the male thread 13 and the tapered outer circumferential surface 14. The flare nut 30 includes: the female thread 31 that is formed on the one end side in the axial direction and fitted to the mail thread 13; the through-hole 32 that is formed on the other end side in the axial direction and located such that the extension pipe 120 is passed through the through-hole 32; the tapered inner circumferential surface 33 that is formed between the female thread 31 and the through-hole 32 and located such that the flare portion 120a of the extension pipe 120 is sandwiched between the inner circumferential surface 33 and the outer circumferential surface 14; and the first annular surface 36 that is formed around the through-hole 32 on the other end side in the axial direction. The sleeve 70 houses the flare nut 30 such that the flare nut can be rotated and moved forward and backward. The rotary ring 50 has the second annular surface 55 that faces the first annular surface 36, and is attached to the sleeve 70 such that the rotary ring 50 can be rotated for the union 10. The coil spring 60 is configured to press the flare nut 30 toward the rotary ring 50. At the second annular surface 55, the claws 56 are provided in such a manner as to protrude toward the flare nut 30. The first annular surface 36 includes the engagement surfaces 37 that are formed in such a manner as to face one side in the circumferential direction and the helically inclined surfaces 38 that are adjacent to the engagement surface 37 in the circumferential direction and formed helically in such a manner as to be inclined and face the opposite side of the above one side in the circumferential direction. The indoor pipe 118 and the extension pipe 120 are examples of pipes. The coil spring 60 is an example of a pressing member.

In the above configuration, when torque is applied to the rotary ring 50 in the tightening direction for the union 10, the claws 56 of the rotary ring 50 are engaged with the respective engagement surfaces 37 of the flare nut 30. Thus, the torque is transmitted from the rotary ring 50 to the flare nut 30, thereby causing the flare nut 30 to rotate in the tightening direction for the union 10. By contrast, when torque is applied to the rotary ring 50 in the opposite direction to the tightening direction, the torque is not transmitted to the flare nut 30, and the rotary ring 50 fails to engage. Furthermore, since the flare nut 30 is housed in the cylindrical sleeve 70 such that the flare nut can be rotated, the above torque in the opposite direction can be prevented from being applied to the flare nut 30 without being transmitted through the rotary ring 50. Therefore, according to Embodiment 1, it is possible to prevent the connection between pipes from being loosened by a person, for example, and prevent pipes once connected from being disconnected by a person, for example.

In the pipe joint structure according to Embodiment 1, the engagement surfaces 37 may be configured to be engaged with the claws 56 when the rotary ring 50 is rotated in the tightening direction for the union 10. The helically inclined surfaces 38 may be configured to cause the claws 56 to slide in the circumferential direction when the rotary ring 50 is rotated for the union 10 in the opposite direction to the tightening direction.

In the pipe joint structure according to Embodiment 1, the helically inclined surfaces 38 may be helical in the same direction as the female thread 31.

The air-conditioning apparatus according to Embodiment 1 includes: the indoor unit 110 that includes the indoor heat exchanger 115 and the indoor pipe 118 extending from the indoor heat exchanger 115; and the outdoor unit 100 that is connected to the indoor unit 110 by the extension pipe 120. The indoor pipe 118 and the extension pipe 120 are connected by the pipe joint structure according to Embodiment 1.

In the above configuration, it is possible to prevent the connection between the indoor pipe 118 and the extension pipe 120 from being loosened, and thus also prevent refrigerant from leaking to an indoor space. For instance, if refrigerant leaks to an airtight indoor room, it is hard to diffuse the leaking refrigerant into the atmosphere. It is therefore possible to obtain a great advantage by applying the pipe joint structure according to Embodiment 1 to the connection between the indoor pipe 118 and the extension pipe 120.

In particular, it should be noted that air-conditioning apparatuses employing flammable refrigerant are required to more reliably prevent refrigerant from leaking to an indoor space. Therefore, it is more advantageous that the pipe joint structure according to Embodiment 1 is applied to air-conditioning apparatuses using flammable refrigerant.

REFERENCE SIGNS LIST 10 union, 11 insertion hole, 12 head, 13 male thread, 14 outer circumferential surface, 20 nut assembly, 30 flare nut, 31 female thread,
32 through-hole, 33 inner circumferential surface, 34 small outside-diameter portion, 35 large outside-diameter portion, 36 first annular surface,
37 engagement surface, 38 helically inclined surface, 39 contact surface, 40 retaining ring, 50 rotary ring, 51 insertion portion, 52 head,
53 through-hole, 54 outer circumferential groove, 55 second annular surface, 56 claw, 60 coil spring, 70 sleeve, 71 small inside-diameter portion, 72 large inside-diameter portion, 73 support surface, 74 inner circumferential groove, 75 cap groove, 80 cap, 81 side wall, 82 bottom surface portion, 83 projection, 84 claw, 100 outdoor unit, 110 indoor unit, 111 rear housing portion, 112 front housing portion, 113 air-outlet housing portion, 114 front design panel, 115 indoor heat exchanger,
116 indoor fan, 117 electric component box, 118, 119 indoor pipe, 120, 121 extension pipe, 120a flare

The invention claimed is:

1. A pipe joint structure formed to connect two pipes and comprising:
   a union connected to one of the two pipes, and including
      a male thread and a tapered outer circumferential surface;
   a flare nut including
      a female thread that is formed at one of axially opposite ends of the flare nut, and is fitted to the male thread,
      a through-hole that is formed in the other of the axially opposite ends of the flare nut, and allows the other of the two pipes to pass through the through-hole,
      a tapered inner circumferential surface that is formed between the female thread and the through-hole, and is located such that a flare portion of the other of the two pipes is sandwiched between the inner circumferential surface and the outer circumferential surface, and
      a first annular surface that is formed around the through-hole at the other of the axially opposite ends of the flare nut;
   a cylindrical sleeve configured to house the flare nut such that the flare nut is allowed to rotate and move forward and backward;
   a rotary ring having a second annular surface that faces the first annular surface, the rotary ring being attached to the cylindrical sleeve such that the rotary ring is allowed to rotate for the union; and
   a spring configured to press the flare nut toward the rotary ring,
   wherein at the second annular surface, a claw is formed in such a manner as to protrude toward the flare nut, and
   wherein the first annular surface includes an engagement surface that is formed in such a manner to face one side in a circumferential direction and a helically inclined surface that is adjacent to the engagement surface in the circumferential direction and formed helically in such a way as to incline and face the opposite side of the one side in the circumferential direction.

2. The pipe joint structure of claim 1, wherein
   the engagement surface is configured to engage with the claw when the rotary ring is rotated in a tightening direction for the union, and
   the helically inclined surface is configured to cause the claw to slide in the circumferential direction when the rotary ring is rotated for the union in the opposite direction to the tightening direction.

3. The pipe joint structure of claim 1, wherein the helically inclined surface is helical in the same direction as the female thread.

4. An air-conditioning apparatus comprising:
   an indoor unit including an indoor heat exchanger and an indoor pipe that extends from the indoor heat exchanger; and
   an outdoor unit connected to the indoor unit by an extension pipe,
   wherein the indoor pipe and the extension pipe are connected by the pipe joint structure of claim 1.

5. The pipe joint structure of claim 1, wherein
   the flare nut includes a first contact surface configured to support a first end of the spring, and
   the cylindrical sleeve includes a second contact surface configured to support a second end of the spring.

6. The pipe joint structure of claim 1, wherein
   the spring is provided between an outer circumferential surface of the flare nut and an inner circumferential surface of the cylindrical sleeve.

7. The pipe joint structure of claim 1, wherein the claw is formed in the shape of a trapezoid having a flat distal end.

\* \* \* \* \*